United States Patent
Loh

(10) Patent No.: US 7,321,885 B2
(45) Date of Patent: Jan. 22, 2008

(54) PRODUCT FRAMEWORK FOR MANAGING TEST SYSTEMS, SUPPORTING CUSTOMER RELATIONSHIPS MANAGEMENT AND PROTECTING INTELLECTUAL KNOWLEDGE IN A MANUFACTURING TESTING ENVIRONMENT

(75) Inventor: Aik Koon Loh, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 82 days.

(21) Appl. No.: 11/183,341

(22) Filed: Jul. 18, 2005

(65) Prior Publication Data

US 2007/0094198 A1   Apr. 26, 2007

(51) Int. Cl.
*G06N 5/00* (2006.01)
(52) U.S. Cl. .................. 706/47; 714/736; 714/724; 714/26
(58) Field of Classification Search .............. 704/9; 706/47; 709/223; 714/26, 736, 724
See application file for complete search history.

(56) References Cited

U.S. PATENT DOCUMENTS

| | | | | |
|---|---|---|---|---|
| 5,157,668 A | * | 10/1992 | Buenzli et al. | 714/26 |
| 5,381,417 A | * | 1/1995 | Loopik et al. | 714/724 |
| 5,590,136 A | * | 12/1996 | Firooz | 714/736 |
| 5,794,178 A | * | 8/1998 | Caid et al. | 704/9 |
| 6,012,152 A | * | 1/2000 | Douik et al. | 714/26 |
| 6,473,794 B1 | * | 10/2002 | Guheen et al. | 709/223 |

* cited by examiner

*Primary Examiner*—Wilbert L Starks, Jr.

(57) ABSTRACT

A software framework for centralizing the management of test plans, test configurations, test sources, debug information for testing electrical devices in a manufacturing testing environment is presented. A three-tier software architecture is defined that allows one-time effort and segregation of tasks related to integration of hardware devices, development of multiple applications, and testing of multiple applications.

15 Claims, 6 Drawing Sheets

PRODUCT FRAMEWORK FOR MANAGING TEST SYSTEMS, SUPPORTING CUSTOMER RELATIONSHIPS MANAGEMENT AND PROTECTING INTELLECTUAL KNOWLEDGE IN A MANUFACTURING TESTING ENVIRONMENT

BACKGROUND OF THE INVENTION

In a product manufacturing testing environment, tests are developed to determine the acceptability of manufactured products and to learn of sources of manufacturing problems. In a typical integrated circuit assembly manufacturing environment, after manufacture each assembly is submitted to an automated tester to perform such tests as continuity and functionality tests on the assemblies. For example, in-circuit testers may be used to achieve both continuity and functional testing.

Typically, during the manufacture of a given product, there will be several lines of production, calling for multiple identical testers testing products of identical design. Currently, each tester operates autonomously. In this regard, each tester requires a test plan, configuration of its test resources, tests, knowledge concerning the assembly under test, etc. This may require multiple test engineers to set up and monitor the testing during production.

The current operating environment therefore leads to several problems. For example, if a problem occurs during testing on one line, the test engineer must determine the source of the problem. The source of the problem may be a manufacturing defect in the assembly itself, or may be occurring within the tester. Often, however, the source of a test problem comes from the test itself—it may be due to programming errors or improper test limits. Furthermore, depending on the source of the problem, the problem may not be immediately apparent during test development. For example, test threshold limits for various components on the assembly under test may be set at certain levels and appear to test correctly for defects in these components when the test run begins. However, over time, as the temperature of the equipment increases, the limits may become insufficient for certain components whose measurements are temperature dependent, causing false test failures in some components of assemblies that are actually in fact without defect.

The use of multiple autonomous testers in the manufacturing testing environment can lead to several inefficiencies and other problems. The use of multiple testers during the production run of a single assembly design requires a common test plan comprising a suite of tests to be executed on each tester. The test software for each tester is identical by design, but each tester must be configured with an independent copy of the software. This can lead to version control and software update problems between the testers.

Additionally, during test development and production runs, debug knowledge about the test plan, individual tests in the suite of tests that make up the test plan, test limits, and specification information about the individual testers may be collected over time. Information learned on one tester may be helpful to diagnosing problems on other testers. Furthermore, information learned during the production and testing of one assembly may be helpful in the diagnosis of problems encountered during the production and testing of a different assembly. However, because the testers are autonomous and are often operated by different individuals, the overall debugging knowledge is typically distributed and fragmented. Accordingly, it would be useful to develop a technique for accumulating and centralizing the debugging knowledge over time. Furthermore it would be useful to allow common access by all testers and test engineers to this centralized information. In addition, debug information used in the testing of the assembly during production may be helpful to product support engineers for debugging problems with the assembly once they are at a customer site. Accordingly, it would also be useful to allow access to this body of centralized debug knowledge to product support engineers and maybe even portions of this information to certain customers. At the same time, because a manufacturer may not want all debugging knowledge exposed beyond the manufacturing environment, it would be desirable to have a technique for controlling the content and access privileges of the debug knowledge.

Another common problem in debugging a test problem is the lack of a standardized debug plan. Typically, when a test problem is first encountered, the test engineer will sort through the available information regarding the tester configuration, the test being executed, the tester resources configuration, test limits, etc., and the steps performed in debugging the problem are entirely at the discretion of, and dependent upon the experience of, the test engineer. The time required in the diagnosis of any given problem can therefore range significantly in time and number of resources. It would therefore be desirable to have at the very least a debug knowledge base to which all test engineers have access. It would further be desirable to develop from this debug knowledge base a common debug plan that dictates steps to be taken to pinpoint the source of test problems. This would ensure that troubleshooting of problems starts from a known status, ensure that relevant information is being utilized in the diagnosing of the problem, and reduce the amount of time in finding the source of the problem.

It would therefore be desirable to have a product framework for the manufacturing test environment that achieves these objectives.

SUMMARY OF THE INVENTION

The present invention is a product framework for the manufacturing testing environment that achieves the above-named objectives. In accordance with the invention, a centralized processor, preferably at a centralized location, manages test plan and test sources to minimize risk of exposing learned test knowledge to unauthorized users.

The present invention affords several advantages over the prior art, including the ability to manage configuration information efficiently and effectively by ensuring consistency of testers' configurations across test systems and allowing ease of modification of testers' information, the ability to service and support the testers in the system to allow ease of troubleshooting and software updating (e.g., patches or new software releases), the ability to access and collect testing related information by providing service and support via internet remote access and by allowing access of the testers and statistical information via he end-user's personal computer, the ability to minimize the risk of disclosing intellectual knowledge by centralizing control of the debugging and optimization knowledge base and standardizing the localization effort, and the ability to gather data from the manufacturing test systems using statistical data gathering for process control and performance data gathering for system optimization and fine-tuning.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
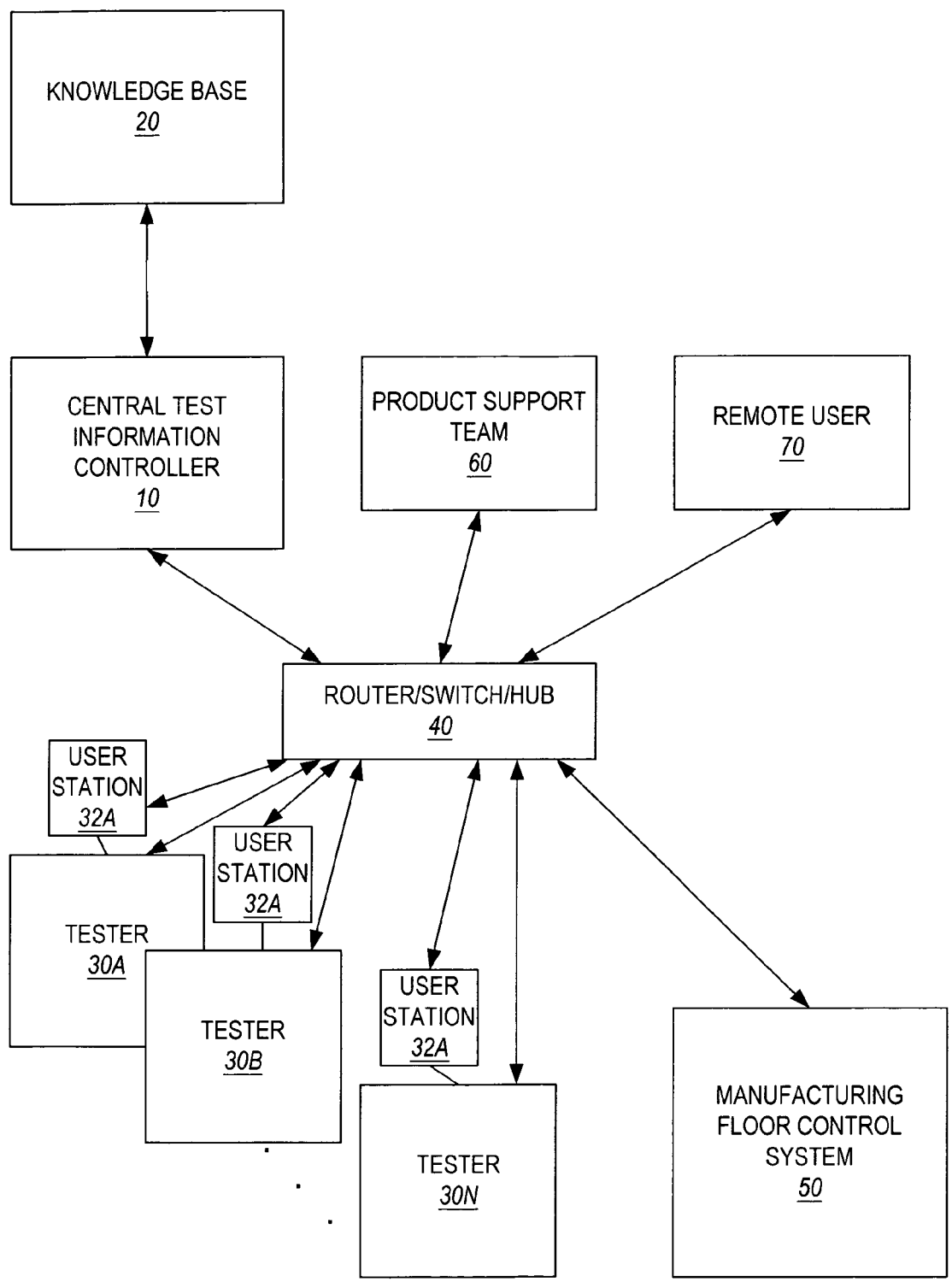
FIG. 1 is a block diagram of an exemplary product framework in accordance with the invention.

Turning now to the drawings, FIG. 1 illustrates a block diagram of a product framework in accordance with the preferred embodiment of the invention. As illustrated therein, the product framework includes a central test information controller 10 which may provide control of and access to a knowledge base 20 that may include one or more of: assembly design test plans and test source configurations, a knowledge database, a localization database, test data history, analysis and optimization knowledge. The central test information controller 10 operates as an interface between the knowledge base 20 and one or more of: one or more test systems 30A, 30B, ..., 30N, a manufacturing floor control system 50, and remote users 70 of the knowledge base such as test engineers, members of a product support team 60, and customers with controlled access.

The central test information controller 10 includes a control function, preferably in the form of a computer system comprising computer hardware that executes computer software which implements the control functionality described hereinafter. In the preferred embodiment, the computer system which implements the control function is implemented as an independent system remote from the actual test systems 30A, 30B, ..., 30N and test system user stations 32A, 32B, ..., 32N; however, it will be appreciated by those skilled in the art that the control function of the central test information controller 10 can be integrated into one or more of the test systems 30A, 30B, ..., 30N and/or user stations 32A, 32B, ..., 32N. If more than one potential control function (e.g., 21, 22, 23, and 24) is implemented throughout the test systems 30A, 30B, ..., 30N and/or user stations 32A, 32B, ..., 32N, the functionality of the control function may be distributed across the various control functions and/or the multiple potential control functions may arbitrate to determine and defer to a single one of the multiple potential control functions during operation of the central test information controller 10.

Figure 2:
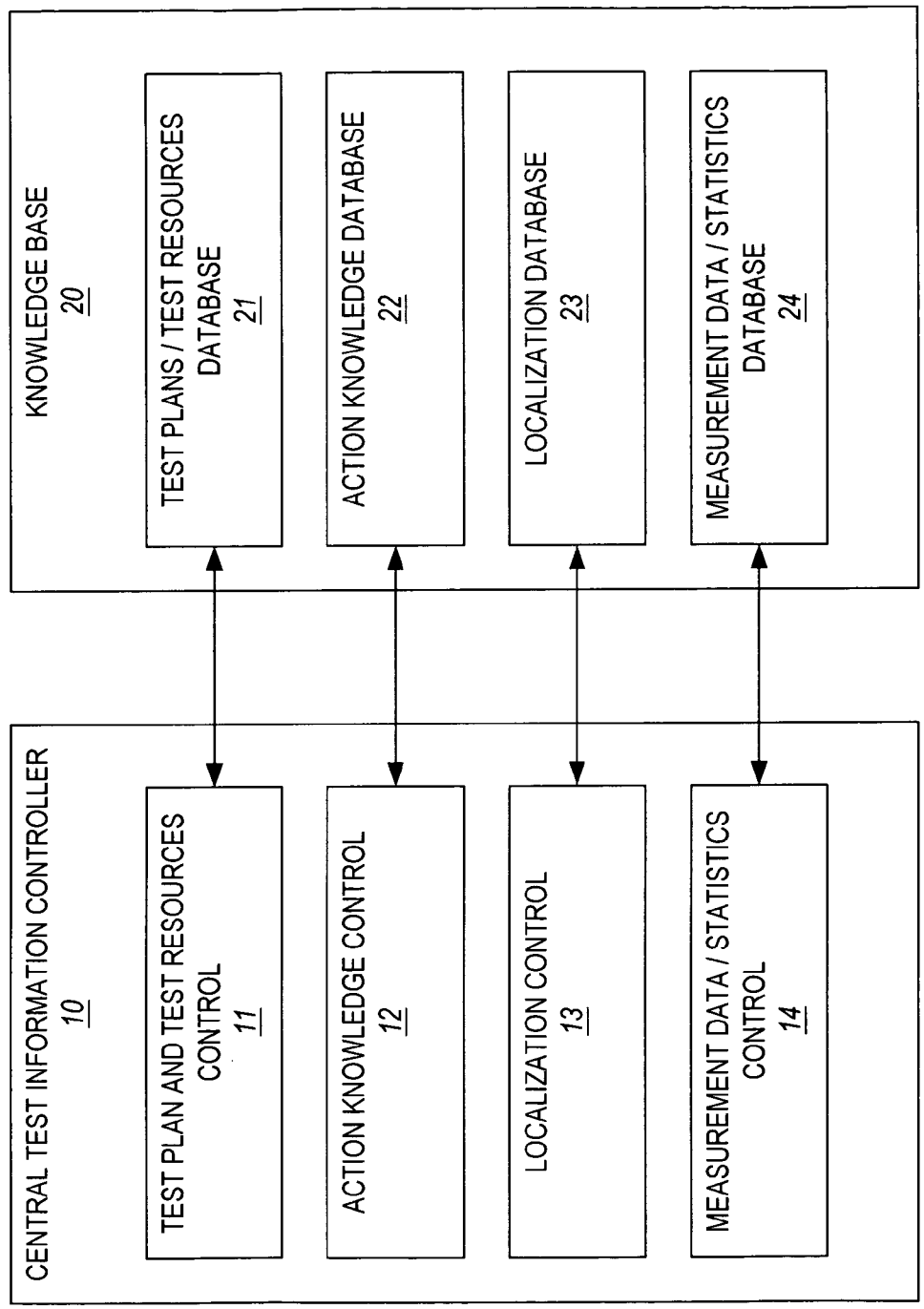
FIG. 2 is a block diagram illustrating the major control functions of an exemplary central test information controller and corresponding knowledge base.

In the preferred embodiment, the central test information controller 10 centralizes and controls knowledge that may be used by any and all testers and various users. In the preferred embodiment, the central test information controller 10 controls knowledge relating to: (1) Test plans and corresponding Test Source configurations; (2) Action Knowledge relating to testing of particular components; (3) Localization Knowledge such as local translations of graphical user interface pages according to the language and presentation customs of a given locality; and (4) Historic Data and/or Statistics. FIG. 2 is a block diagram illustrating the major control functions of the central test information controller 10 and corresponding databases that collectively form the Knowledge Base 20. In the preferred embodiment, the central test information controller 10 may include a test plan and test resources control function 11 which reads and writes test plan and test resource information to a test plans and test resource database 21, an action knowledge control function 12 which reads and writes action knowledge relating to specific components of an assembly under test to an action knowledge database 22, a localization control function 13 which reads and writes localization information to a localization database 23, and a measurement data and statistics control function 14 which reads and writes measurement data and/or statistical information to a measurement data and statistics database 24.

During production manufacturing, test plans are followed that comprising suites of tests to be executed by the testers that test various components on the assembly under test. For example, when the assembly under test is a printed circuit board with components including resistors, capacitors, integrated circuits, and other discrete components, a test plan may include a series of tests for an in-circuit tester that includes tests that test each of the resistors for connectivity and resistance values, tests that test each of the capacitors for connectivity and capacitance values, and tests that test each of the integrated circuits for connectivity and functionality. This test plan may be followed for testing each manufactured board of identical design. Test resource configurations are derived from the PCB layout of the assembly under test and test plans determine the running sequence and coverage. During high volume production there may be multiple testers testing assemblies of the same design. Thus, when multiple testers are used to test manufactured boards during production, the test plan must be deployed to each tester.

Figure 3:
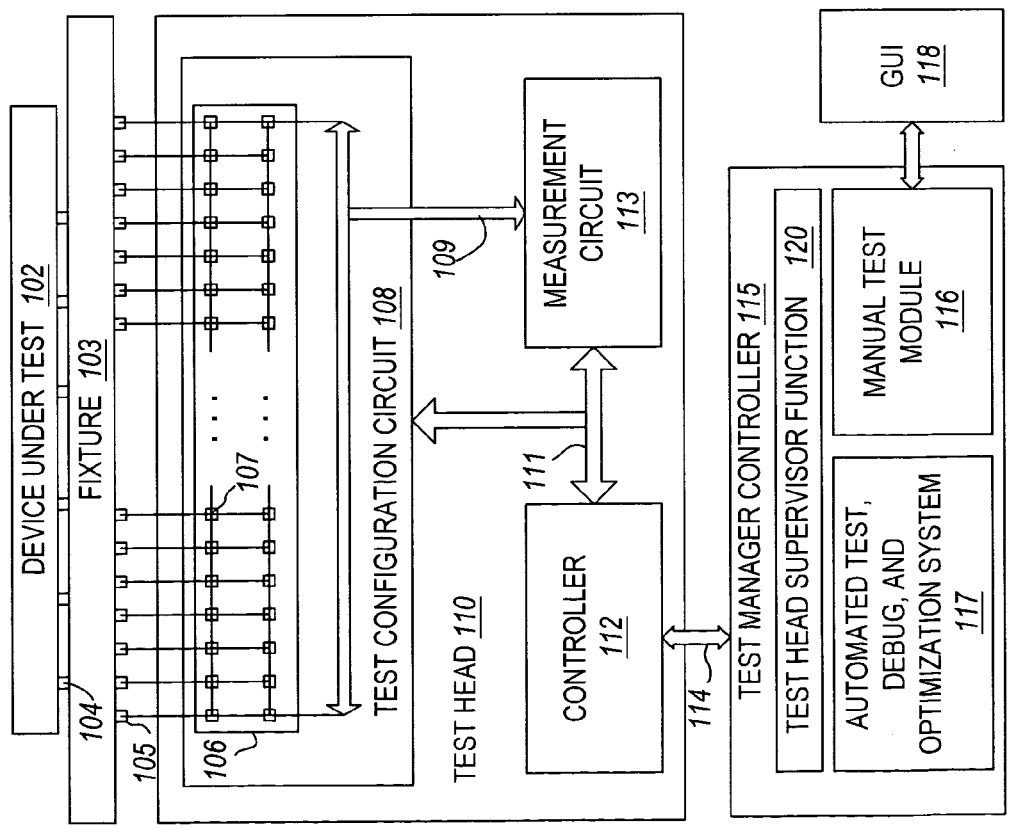
FIG. 3 is a schematic block diagram of an automated test system implemented in accordance with the invention.

For each test to be executed by the tester under the test plan, the test resources of tester must be configured to perform the test to obtain the test measurements associated with the test. By way of example, FIG. 3 is a schematic block diagram of an example automated in-circuit test system 100 that may be used to test a printed circuit board assembly containing components such as integrated circuits, resistors, capacitors, and other discrete components connected by way of a labyrinth of traces to form a functional circuit. As illustrated, test system 100 includes a test head 110 which supports a fixture 103 on which a printed circuit board (PCB) containing or implementing a device under test (DUT) 102 is mounted by way of a fixture 103. The test head 110 may include a controller 112, a test configuration circuit 108, and a measurement circuit 113. Fixture 103, for example a bed-of-nails fixture, is customized for each PCB layout and includes a plurality of probes 104 that electrically connect to nodes of the device under test 102 when the device under test 102 is properly seated on the fixture 103. Probes 104 are coupled via the fixture 103 to test head interface pins 105.

The test configuration circuit 108 may include a matrix 106 of relays 107 which is programmable via controller 112 over control bus 111 to open and/or close each relay 107 in the matrix 106 to achieve any desired connection between the interface pins 105 of the test head 110 and a set of measurement busses 109. Measurement busses 109 are electrically connected to nodes of the measurement circuit 113. The particular nodes of measurement circuit 113 which are connected to the set of measurement busses 109 may be hardwired within the measurement circuit 113, or alternatively, may be configurable via another programmable matrix (not shown) of relays. Controller 112 receives test setup instructions from a test manager controller 115 to program the matrix 106 (and other relay matrices, if they exist) to achieve a set of desired connection paths between the device under test 102 and measurement circuit 113.

Measurement circuit 130 includes operational amplifier 132 having a positive input terminal 146 coupled to ground and a negative input terminal 148 coupled to an input node I 140. A reference resistor $R_{ref}$ 142 is coupled between output node $V_O$ 144 and input node I 140 of operational amplifier 132. A component under test 138 on the DUT 102 characterized by an unknown impedance $Z_X$ is coupled between input node I 140 and a source input node S 136. The source input node S 136 is stimulated by a known reference voltage $V_S$ that is delivered by a voltage stimulus source 134. Assuming an ideal operational amplifier circuit, the current $I_X$ through the unknown impedance $Z_x$ of the component under test 138 should be equal to the current through reference resistor $R_{ref}$ 142 and a virtual ground should be maintained at negative input terminal 148. As is well-known in the art, in an ideal operational amplifier circuit the theoretical impedance calculation is:

$$Z_x = -R_{ref}(V_S/V_O).$$

The use of a precision DC voltage stimulus source 34 and a DC detector at output node $V_O$ 144 is employed to determine the resistive component of the output voltage when testing resistive analog components such as resistors. The use of a precision AC voltage stimulus source 134 and a phase synchronous detector at output node $V_O$ 144 is employed to determine the reactive components of the output voltage when testing reactive analog components such as capacitors and inductors.

Additional measurements, outside the scope of the present invention, are often taken to reduce guard errors and compensate for lead impedances. In order to take a set of measurements, the connection paths from the component under test 138 on the DUT 102 to the measurement circuit 113 are set up by programming the relay matrix 106 to configure the relays 107 to electrically connect the probes 104 of the fixture 103 that are electrically connected to the nodes on the device under test 102 to the measurement circuit 113 via the internal measurement busses 109. In the example measurement circuit 130 of FIG. 2, the internal measurement busses include an S bus and an I bus which are respectively electrically connected to the source node S 136 and input node I 140. Connections of the internal measurement busses 109 from the device under test 102 to the measurement circuit 113 are programmed at the beginning of the test for the component under test 138, during the test setup. After the connections have been made, the actual test measurements of the component under test 138 may be obtained by the measurement circuit 113 after waiting for the inherent delays of the relay connections to be completed. At the conclusion of the test, the relay connections are all initialized to a known state in preparation for the start of the next test.

Figure 4:
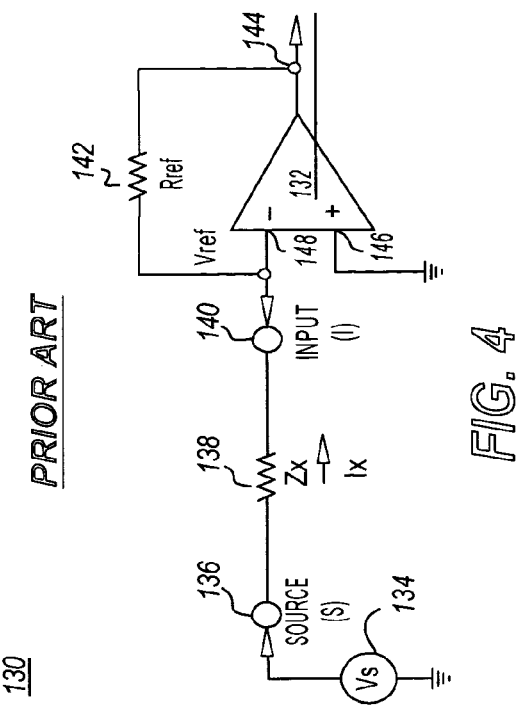
FIG. 4 is a schematic diagram of a prior art measurement circuit.

The measurement circuit 130 described in FIG. 4 is for purposes of example only. FIG. 4 illustrates example hardware connections, in particular, the measurement circuit 113 of FIG. 3, that must be provided by in-circuit test system 100 to perform the in-circuit test on a particular device, in this case as device 138 characterized by an unknown impedance $Z_X$. It will be appreciated, however, that a typical in-circuit test will cover many thousands of devices, including resistors, capacitors, diodes, transistors, inductors, etc.

Turning back to FIG. 3, the test manager controller 15 preferably comprises a test head supervisor function 120, a manual test module 116, and automated test debug and optimization system module 117. The test manager controller 115 preferably communicates with the test head controller 112 over a bus 114. Such communication includes instructions to configure the matrix 106 of relays 107, (and other relay matrices, if they exist) to achieve a set of desired connection paths between the device under test 102 and measurement circuits 113, test data, test instructions, and return test results data generated by the test head 110.

The manual test module 116 may receive manually submitted tests for execution on the test head 110. Manually submitted tests may be submitted, for example, via a graphical user interface 118 executing on a computer system. Manually submitted tests may be formulated by a test engineer on-the-fly or may be pre-formulated and downloaded to the test manager controller 115 at the time the test is to be submitted to the test head 110.

The automated test debug and optimization system 117, discussed in detail hereinafter, generates, debugs and/or optimizes in-circuit tests for the DUT 102 executed by the test head 110.

The test head supervisor function 120 manages the submission of tests received from various sources, for example from both the manual test module 116 and the automated test debug and optimization system module 117, to the test head 110 for execution.

Operation of such an automated test & debug controller 140 is described in greater detail in co-pending U.S. application Ser. No. UNKNOWN, to Loh et al., entitled "Method And Apparatus For Automated Debug And Optimization Of In-Circuit Tests", and in co-pending U.S. application Ser. No. UNKNOWN, to Loh et al., entitled "A Framework That Maximizes The Usage Of Testhead Resources In In-Circuit Test System", both of which are hereby incorporated by reference for all that they teach.

In the system 100 of FIG. 3, the automated test debug and optimization system 117 automatically generates tests for the DUT 102 to be executed by the test head 110 based on information contained in a rule-based action knowledge database, for example, 22 in FIG. 2.

Figure 5:
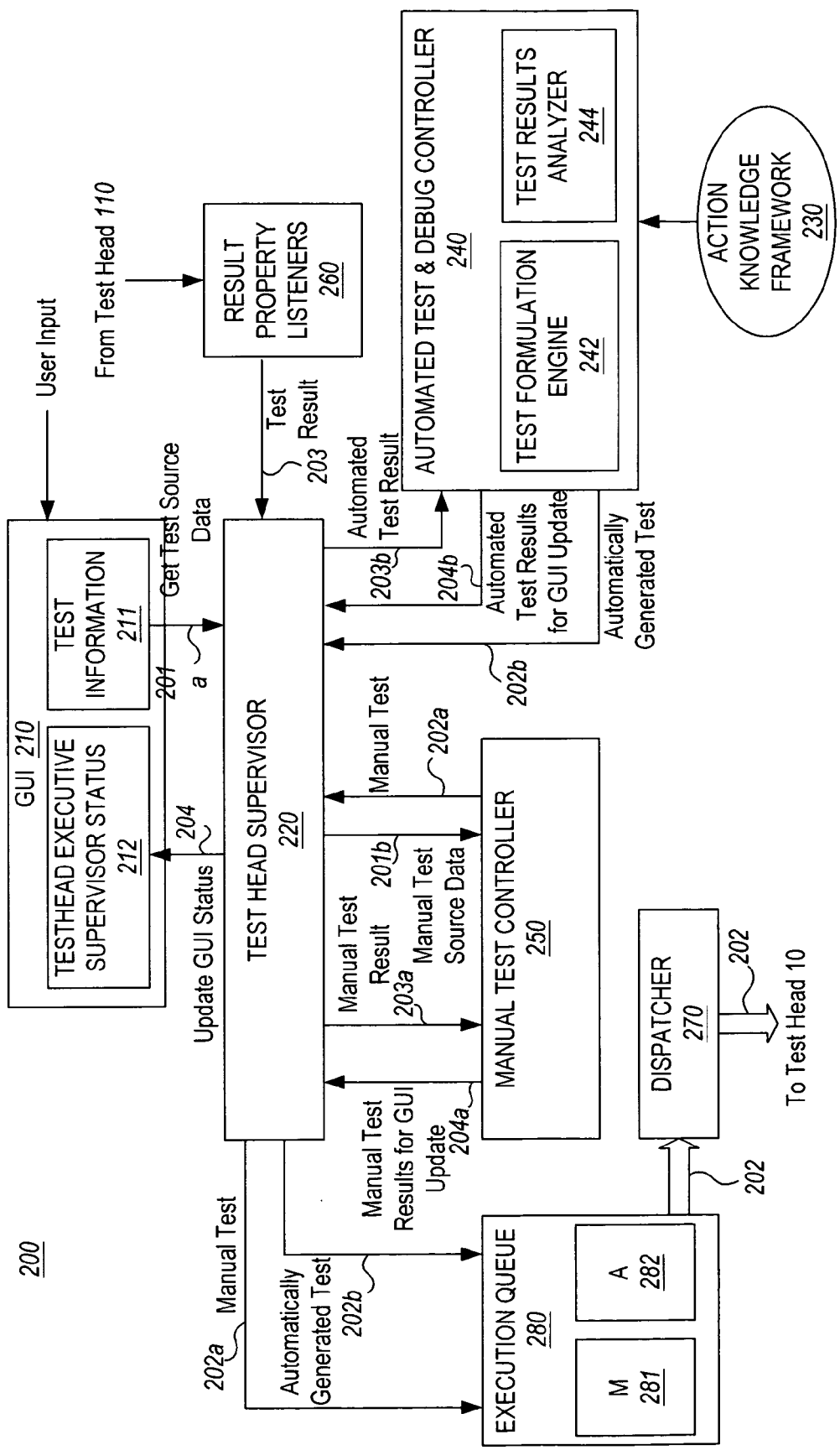
FIG. 5 is a block diagram of the software framework for the automated test system of FIG. 3.

FIG. 5 shows an exemplary embodiment 200 of the software framework of a test system such as test system 100 in FIG. 3 which utilizes a rule-based action knowledge database 230 for the automatic formulation of tests. Generally, the software framework 200 implements executable software code to perform the functionality for the following modules: a Testhead Execution Supervisor 220, a Manual Test Controller 250, and an Automated Test & Debug Controller 240. It is to be understood that the functionality described for each of the modules may be variously embodied, and that the modules may be combined or the functionality of the modules otherwise distributed.

The Testhead Execution Supervisor 220 is the single point of contact (SPOC) that interfaces between the test head controller engine (112 in FIG. 3) and the Manual Test Controller 250 and Automated Test & Debug Controller 240. All requests to use or access the test head 110 are submitted and synchronized through the Testhead Execution Supervisor 220. The Testhead Execution Supervisor 220 receives tests 202a, 202b to be submitted to the test head 110 from multiple sources, namely the Manual Test Controller 250 and Automated test & debug controller 240, and enters them into one or more execution queues 280 for dispatch to the test head 110. The test head 110 executes only one test at a time. A dispatcher function 270 monitors the status of the test head 110 and if the test head 110 is idle, selects a test 202 from the execution queue(s) 280, sends it to the test head 110 for execution, and removes it from the execution queue 280 once execution of the test 202 by the test head 110 is completed.

A graphical user interface (GUI) 210 collects user input from a user and displays test status and other related information. The GUI 210 includes a test information collection function 211 that collects Test Source Data 201*a* from the user that is sent to through the test head supervisor 220 to the manual test controller 250 (as manual test source data 201*b*) and used by the manual test controller 250 to formulate a manual test 202*a*.

The test head supervisor 220 receives manual tests 202*a* from the manual test controller 250 and causes them to be entered into an execution queue 280, as detailed hereinafter.

When a test 202 is executed on the test head, one or more result property listeners 260 monitor the test head for available test results 203. Test results 203 are forwarded by the result property listeners 260 to the test head supervisor 220 for forwarding on to the appropriate test controller (e.g., the manual test controller 250 if the test result 203*a* is of a manual test 202*a*, or the automated test & debug controller 240 if the test result 203*b* is of an automatically generated test 102*b*).

The GUI 210 also includes a testhead executive supervisor status function 212 that receives test result status 204 for use in updating the GUI display for presentation to the user.

The automated test & debug controller 240 includes a test formulation engine 242 which generates one or more tests 202*b* that are ready for execution by the test head 110 during the lifetime of the automated debug controller 240. In automatically generating a test 202*b*, the test formulation engine 242 accesses a knowledge framework 230 to determine the appropriate actions to take, which may include validation criteria and stability criteria.

In order to better understand the nature of automatic test generation, we first turn to an example format of a test file 202 expected by the test head 110. The test 202 received by the test head 110 will typically be packaged in a data structure that includes the information contained in the source file of the test to be debugged, and also other information such as device name, etc. For example, the test source file 202 for a resistor device family may look like the following:

R208.dat

!!!! 2 0 1 1021582599 0000
! IPG: rev 05.00pd Thu May 16 14:56:40 2002
! Common Lead Resistance 500m, Common Lead Inductance 1.00u
! Fixture: EXPRESS
disconnect all
connect s to "R208-1"; a to "R208-1"
connect i to "R208-2"; b to "R208-2"
resistor 10, 12.8, 3.75, re1, ar100m, sa, sb, en
! "r208" is a limited test.
! DUT: nominal 10, plus tol 1.00%, minus tol 1.00%
! DUT: high 10.1, low 9.9
! TEST: high limit 11.276, low limit 9.625
! Tolerance Multiplier 5.00
! Remote Sensing is Allowed Each test 202 tests a single individual component on the DUT 102 mounted on the fixture 103 of the test head 110, and is a representation of the test source file that has been prepared (i.e. compiled into object code and therefore no longer in the ASCII text readable format) to run/execute on a different processor on the test head 110.

Figure 6:
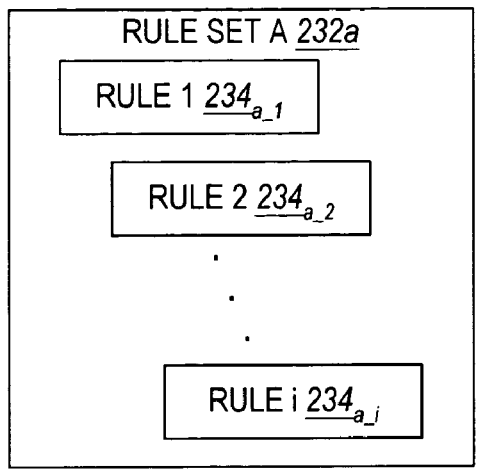
FIG. 6 is a block diagram of a knowledge framework in accordance with the invention.
Figure 6:
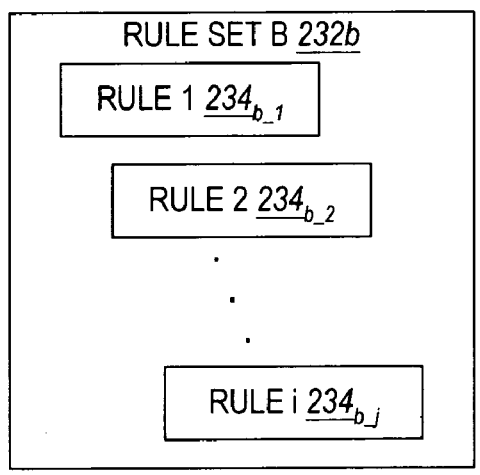
Figure 6:
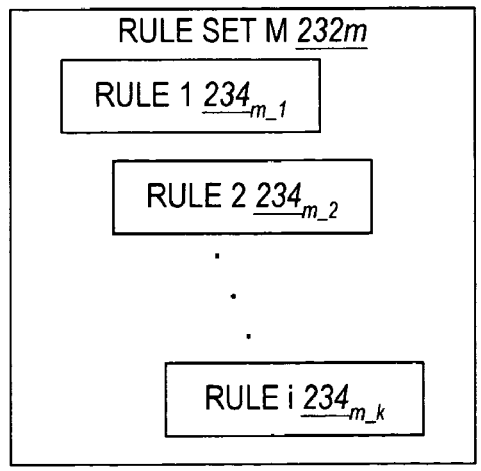
Figure 7:
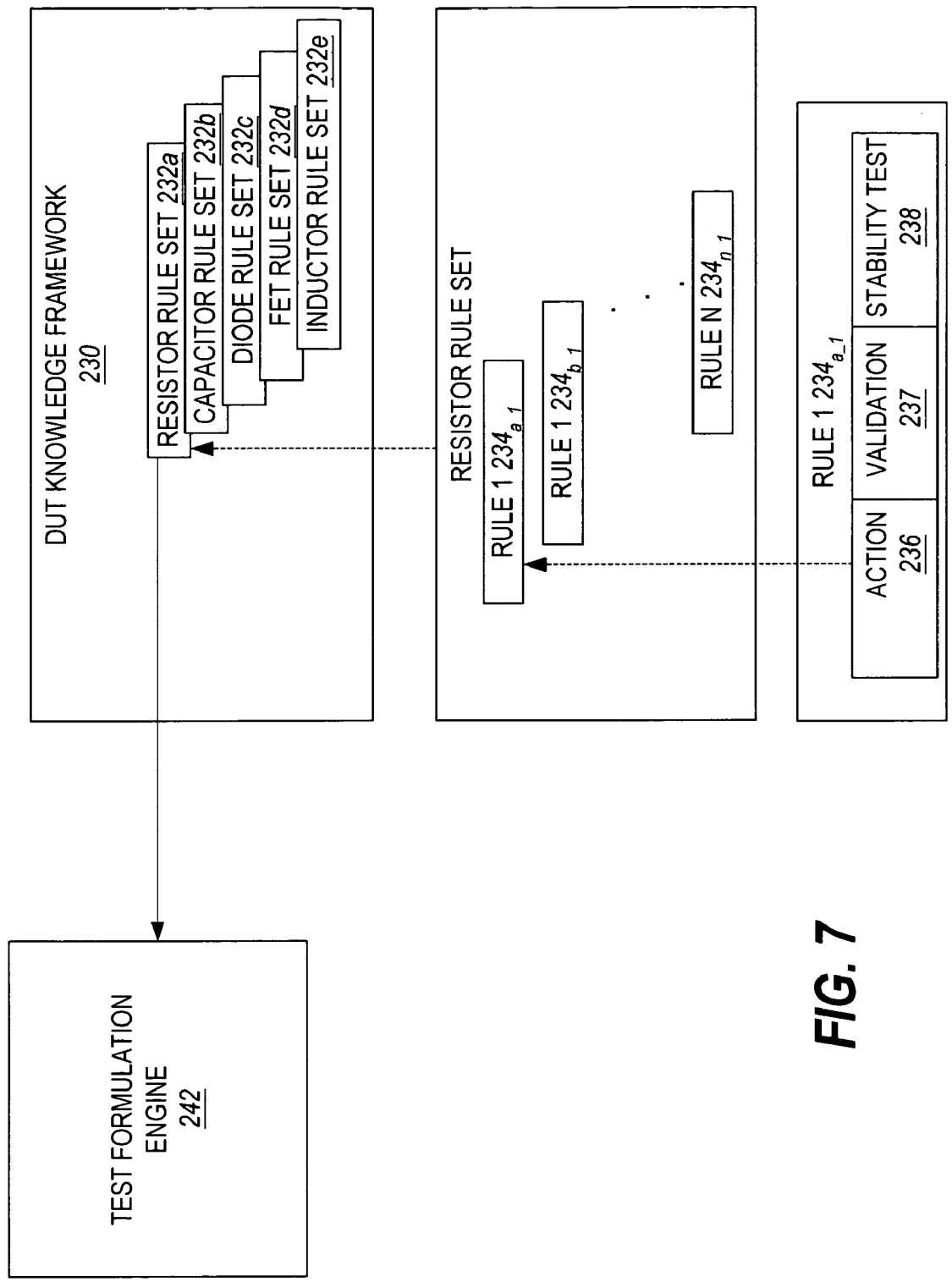
FIG. 7 is a structural diagram of an exemplary embodiment of a rule.

Turning back to discussion of the automated test & debug controller 240 and the automatic generation of tests based on the action knowledge framework 230, the action knowledge framework 230 contains the test knowledge about the various components to be tested on the DUT 102, which allows the automated debug controller 240 to determine how to formulate and package a given test. A more detailed diagram of a preferred embodiment of the knowledge framework 230 is illustrated in FIG. 6. As shown therein, the knowledge framework 230 includes one or more rule sets $232_a$, $232_b, \ldots, 232_m$. Each rule set $232_a, 232_b, \ldots, 232_m$ has associated with it one or more rules $234_{a\_1}, 234_{a\_2}, \ldots, 234_{a\_i}, 234_{b\_1}, 234_{b\_2}, \ldots, 234_{b\_j}, 234_{m\_1}, 234_{m\_2}, \ldots, 234_{m\_k}$. FIG. 7 illustrates the structure 234 of each rule $234_{a\_1}, 234_{a\_2}, \ldots, 234_{a\_i}, 234_{b\_1}, 234_{b\_2}, \ldots, 234_{b\_j}, 234_{m\_1}, 234_{m\_2}, \ldots, 234_{m\_k}$. As shown in FIG. 7, each rule preferably includes three components, including an action component 236, a validation test component 237, and a stability test component 238 (e.g., a process capability index (CPK)).

The action component 236 represents the debugging/optimization strategy. The action component 236 can implement or point to code such as library functions that are to be executed.

The validation test component 237 comprises or points to a test or algorithm that compares an expected result against the actual results measured by the tester. Typically the validation test component 237 will include many expected parameter values to be verified against the received parameter values in order to verify that the automatically generated test 202*b* passed.

The stability test component 238 is conducted to verify the robustness of a test. During operation, the stability test component 238 is only performed if the validation test passes. Stability test is conducted by applying the validity test a number of times to gather its statistical value (e.g., the process capability index CPK). The CPK is a measurement that indicates the level of stability of the formulated test derived from the knowledge framework 230.

The knowledge framework 230 includes a rule set for every possible component (e.g., resistor, car, diode, FET, inductor, etc.) to be tested on the DUT 102. The automated debug controller 240 operates at an active rule-set level. Each device/component family can have many rule sets, but at any given time, only one rule set in the knowledge framework 230 can be active. The test formulation engine 242 in the automated debug controller 240 executes only the rules in the active rule set for each device/component family.

The set of rules 234 in each rule set 232 are ordered according to a predetermined priority order. The test formulation engine 242 executes the rules within the rule set according to the predetermined priority order. In particular, the test formulation engine 242 generates a list of parameters/measurements that the test head should obtain based on the action component 230 and validation component 237 of the currently selected rule 234 of the active rule set 232. This list of parameters/measurements represents the merits of the test from which the component being tested can be classified as "good" or "bad". Other classifications are possible.-

Once the test formulation engine 242 automatically generates a test 102b, the automatically generated test 202b is sent to the test head execution supervisor 220 for insertion into the execution queue 280.

The automated debug controller 240 includes a test results analyzer 244. The test results analyzer 244 processes the test results 203b resulting from execution of the test 202b by the test head 110, compares the actual parameters/measurements to those expected as indicated in the test validation component 237 of the rule 234 from which the test 202b was generated.

If one or more of the actual test parameters does not meet the expected parameters/measurements set forth by the test validation component 237 of the rule 234 from which the test 202b was generated, the test is considered bad and is discarded. If additional unprocessed rules 237 in the active rule set 232 remain to be processed, the test formulation engine 108 then selects the next highest priority rule 234 from the set 232, and generates a new test 202b based on the selected new rule.

The process is repeated until a valid test 202b is found. Once a valid test 202b is found, then the test is re-executed one or more iterations to generate actual stability levels (e.g., CPK) and the results compared to the required stability criteria as set forth in the stability component 237 of the rule 234 from which the test 102b was generated. If the test 202b passes the stability test, it is considered a valid test.

Operation of the automated test & debug controller 240 is described in greater detail in co-pending U.S. application Ser. No. UNKNOWN, to Loh et al., entitled "Method And Apparatus For Automated Debug And Optimization Of In-Circuit Tests", which is hereby incorporated by reference for all that it teaches.

A result property listener function 260 monitors status and data coming back from the test head 110 and packages the status and data into test results 203. The test results 203 comprise the test parameters that are actually measured by the test head 110 during execution of the test. The test results 203 are passed back to the test head execution supervisor 220, indicating that test execution on the test head 110 is complete and that the test head 110 resource is freed up for a new job. The test head execution supervisor 220 forwards the test results 203 to the source (i.e., either the manual test controller 250 or the automated test & debug controller 240) from which the test was originated. The dispatcher function 270 monitors the status of the test head 110. When the test head 110 becomes idle due to completion of a test, if there are pending tests waiting for dispatch to the test head 110 present in the dispatch queue 280, removes the next highest priority pending test from the queue 280 and allocates the test head 110 resource to execution of the next test.

In terms of the execution queue 280, the test head supervisor 120 enters testhead-ready tests 202a, 202b in priority order in the execution queue 280. As the test head resource comes available, the dispatcher function 270 removes the highest priority test from the queue 280, and dispatches it to the test head 110 for execution. Preferably, a priority scheme is implemented to ensure that manually submitted tests are executed with higher priority than automatically generated tests. For example, a test submitted with a manual identity "M" will have higher execution priority over tests submitted with an automated test identity "A". As described hereinafter, the automated test rule-based framework 230 is made up of multiple automated tests (or "actions" 236), allowing manual tests to intercept in between the automated tests. By deploying the automated test framework 230 as the basis of the overall testing operation, the test head 110 may be made to run continuously, toggling in between the manual tests 202a that are submitted by the test engineer and the system generated automated tests 202b.

The above discussion details a test system 100, 200 which executes manual and automatically formulated tests. In terms of the present invention, the test knowledge is preferably stored, controlled, and accessed through a central test information controller and knowledge base such as central test information controller 10 of FIG. 1. In implementation, as shown in FIG. 2, the central test information controller 10 may include a test plan and test resource controller 11 to store and to control access to test plans and tests in the test plan and test resource database 21 of the knowledge base 20. During a production run setup, each tester 30A, 30B, . . . , 30N may communicate with the central test information controller 10 to gain access to the test plan associated with the particular PCB assembly 102 under production and the associated test resource configuration data associated with each of the tests to be executed under the plan. Then, if production is stopped for some reason and one or more intervening jobs for assemblies of different designs are manufactured and tested, since the test plan and test resource configuration data is stored and accessible in a central test plan and test resource database 21, the testers 30A, 30B, . . . , 30N can be quickly set up and reconfigured to manufacture and test PCBs of the previous PCB assembly design once again. More particularly, because the central test information controller 10 is configured with the ability to store Test Plan and Test Source information, and since the central test information controller 10 operates as a single point of control (SPOC) for all test systems 30A, 30B, . . . , 30N, it therefore allows quick and efficient synchronization and version/revision controls of test plan and test resource configurations for multiple tester systems running under the same environment. This production framework therefore allows support of portability, and can be used as the framework for manufacturing production of nearly any type.

The central test information controller 10 stores the test plan and test resources configuration information as data in the test plan and test resources database 21. All testers 30A, 30B, . . . , 30N during a production run of the assembly under test communicate with the central test information controller 10 to get the current test plan for the particular assembly under test. This allows for easy updates and version control of the test plan. For example, if problems with a test are discovered and debugged, the test resource configuration file for that test can be easily updated in the test plan and test resource database 21 via the test plan and test resource controller 11 of the central test information controller 10, and since all tester systems 30A, 30B, . . . , 30C get the test plan and test resource configuration information from the central knowledge base 20 (via the central test information controller 10), all testers can be quickly updated and synchronized with the same updated test plan version with ease and efficiency.

The test system 100, 200 detailed above also utilizes an action knowledge base 230 that contains rule-based actions for automatically formulating tests for execution on the test head 110. In the present invention, this action knowledge base 230 is preferably centralized to maintain a single accessible copy that is accessible by all test systems with valid access privileges. To this end, the action knowledge base 230 is accessed via the central test information controller 10 of FIG. 1, which preferably implements an action knowledge control function 12 which allows access to action knowledge relating to specific components of the DUT 102 stored in an action knowledge database 22, 230 in the knowledge base 20. As in the case with centralization of test plans and test resources, the centralization of the action knowledge base 22, 230 by way of the central test information controller 10 also allows for ease of updates, maintenance, and data synchronization.

A test system such as system 100 of FIG. 3 may include a localization control function 13 which controls access to (i.e., reads and writes) localization information stored in a localization database 23. Localization refers to the adaptation of language, content and design to reflect local cultural sensitivities. Different manufacturing sites may be located in different locales that are characterized by different languages, customs, and graphical presentation configurations. Graphical and textual information presented to users must be presented in a form according to the language, customs, and configurations specific to that site. Generally, operating systems of computerized systems have a configurable locale parameter that may be set to allow display of user interface content in the language and customs of the locale of the system. Each graphical and/or text screen, webpage, or physical documentation for a supported locale that is presented to customers, potential sales prospects, and engineers, must have an associated language translation and custom presentation specific to the supported locale. Supporting even a few different locales can result in a large database support project. Changes and updates to any given document can result in corresponding changes across all locales.

In the preferred embodiment of the present invention, localization data including all information required to present the user interface and documentation to the user in any supported locale, is centrally stored in the knowledge base 20 in the localization database 23. The central test information controller 10 may include a localization database controller 13 that provides access to any information stored in the localization database 23. Because all localization information is stored centrally and accessed through a single point of contact (i.e., the central test information controller 10), only a single copy of each localization file is required, facilitating ease of support to user interface pages and documentation in all locales.

The test system such as system 100 of FIG. 3 may include a statistics or optimization control module (e.g., in the manufacturing floor control system 50 of FIG. 1) that may be configured to automatically collect statistics regarding measurements obtained during execution of certain tests, data concerning the DUT, tester, or test, etc. This data may be communicated to a statistical process control module for analysis. Accordingly, as shown in FIG. 2, the central test information controller 10 may include a measurement data and statistics control function 14 which reads and writes measurement data and/or statistical information to a measurement data and statistics database 24. Again, since all measurement and/or statistics data and/or statistics or optimization control module configuration data is stored centrally and accessed through a single point of contact (i.e., the central test information controller 10), the invention provides centralization of all measurement and/or statistical related information, allowing ease of access of the data across all test systems, thereby facilitating compilation of overall statistical data.

The centralization of the collective system knowledge and control of access to that knowledge serves as both an efficient means of knowledge/configuration support in terms of maintenance and updates. Additionally, the centralization of system knowledge, and the controlled access thereto serves to protect the knowledge from unauthorized copying or viewing. Access to the knowledge base 20 can be restricted generally, or on a tiered structure according to various levels of clearance. For a given test system, there may be years invested into learning, generating, and compiling the action knowledge database including years of test engineer debugging experience. For many complex systems, the development of tests and test plans may take days or even weeks. The translation of user interface pages and user documentation required in the localization effort may take months and ongoing support. A company may have invested significant capital in all of the aforementioned development efforts, and accordingly, the importance of protecting the intellectual knowledge on a system wide basis cannot be overemphasized.

A Product Support Team 60 may be connected to the knowledge base 30 by way of the central test information controller 10 to access and collect testing related information from any of the test systems 30A, 30B, . . . , 30N in the system. This allows ease of providing service and support via internet remote access, and ease of accessing the test systems and statistical information.

Remote users 70 may also be connected to access and collect testing related information from test systems 30A, 30B, . . . , 30N in the system for which the user has authorization. This allows ease of providing service and support via internet remote access, and ease of accessing the test systems and statistical information.

In the preferred embodiment, remote access is provided via the Internet; accordingly, a router 40 is implemented with a virtual private network (VPN) router to provide internet access. A switch is required for intranet access.

Since both the product support team 60 and the end users 70 can access the test systems 30A, 30B, . . . , 30N remotely, the product support team 60 and end users 70 may more easily troubleshoot test system problems.

Since all knowledge is centralized and accessed through the central test information controller 10, software, test plans, test sources, rule-based actions, debug information, troubleshooting information, localization information, documentation, etc., is easily maintained to allow synchronization of all users of the information.

Those of skill in the art will appreciate that the invented method and apparatus described and illustrated herein may be implemented in software, firmware or hardware, or any suitable combination thereof. Preferably, the functionality of the central test information controller 10 and knowledge base 20 are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. For example, although the preferred embodiment has been discussed herein in the context of in-circuit printed circuit board assembly testers, the product framework of the invention may be applied to other manufacturing test systems such as x-ray or optical based technologies, or to testers of other types of products altogether. It is also possible that other benefits or uses of the currently disclosed invention will become apparent over time.

What is claimed is:

1. An apparatus, comprising:
   a test system knowledge base having a test plan and test resource database for storing test plans, and corresponding test resource configuration data, for configuring a plurality of printed circuit board assembly testers to test at least one printed circuit board assembly; and
   a central test information controller configured to receive requests for the test plans from the plurality of testers and to provide the respective requested test plans, and corresponding test resource configuration data, to each of the requesting respective testers.

2. An apparatus in accordance with claim 1, wherein the central test information controller comprises a test plan and test resource controller that controls storage and retrieval of tests plans in the test plan and test resource database.

3. An apparatus in accordance with claim 1 wherein the test system knowledge base comprises a rule-based action database comprising one or more rules associated with respective components of the at least one printed circuit board assembly, the rules specifying test actions to perform on the respective components of the at least one printed circuit board assembly.

4. An apparatus in accordance with claim 3, wherein the central test information controller comprises an action knowledge database controller that controls storage and retrieval of rules and associated actions to be associated with respective components in the rule-based action database.

5. An apparatus in accordance with claim 1, wherein the test system knowledge base comprises a localization database comprising localization information for presenting test system information to a user of one of the testers, according to a specified localization parameter.

6. An apparatus in accordance with claim 5, wherein the central test information controller comprises a localization database controller that controls storage and retrieval of localization information in the localization database.

7. An apparatus in accordance with claim 1, wherein the test system knowledge base comprises a measurement data and/or statistics database comprising information related to measurement data and/or statistics collected form the testers.

8. An apparatus in accordance with claim 7, wherein the central test information controller comprises a measurement data and/or statistics controller that controls storage and retrieval of information related to measurement data and/or statistics in the measurement data and/or statistics database.

9. A test system, comprising:
   a plurality of printed circuit board assembly testers;
   a knowledge database having a test plan and test resource database for storing test plans, and corresponding test resource configuration data, for configuring the testers to test at least one printed circuit board assembly; and
   a central test information controller configured to receive requests for the test plans from the plurality of testers and to provide the respective requested test plans, and corresponding test resource configuration data, to each of the requesting testers, the central test information controller operating as a single point of contact between the testers and the knowledge database.

10. The test system of claim 9, wherein:
    the knowledge base comprises an action knowledge database for automatically generating tests for the testers; and
    at least one of the plurality of testers comprises an automated test generation function that accesses the action knowledge database by way of the central test information controller for use in automatically generating tests for execution on the at least one of the plurality of testers.

11. The test system of claim 9, wherein:
    the knowledge base comprises a localization database comprising localization information for presenting test system information to a user of one of the testers according to a specified localization parameter; and
    the central test information controller comprises a localization database controller that controls storage and retrieval of localization information in the localization database, and controls access to the localization information by the testers.

12. The test system of claim 9, wherein:
    the knowledge base comprises a measurement data and/or statistics database comprising information related to measurement data and/or statistics collected from the testers; and
    the central test information controller comprises a measurement data and/or statistics controller that controls storage and retrieval of the information related to measurement data and/or statistics in the measurement data and/or statistics database.

13. The test system of claim 9, further comprising:
    means for remotely accessing the central test information controller.

14. A method for centralizing test system knowledge, the method comprising the steps of:
    storing test system knowledge, including test plans and corresponding test resource configuration data for configuring a plurality of printed circuit board assembly testers to test at least one printed circuit board assembly, in a centralized test system knowledge base;
    receiving, at a central test information controller, requests for the test plans from a plurality of printed circuit board assembly testers; and
    in response to the requests for the test plans, respectively providing to the testers, via the central test information controller, the requested test plans, and corresponding test resource configuration data.

15. A test system, comprising:
    a plurality of printed circuit board assembly testers;
    a knowledge base having a measurement data and/or statistics database storing information related to measurement data and/or statistics collected from the testers; and
    a central test information controller comprising a measurement data and/or statistics controller that receives measurement data from the testers and controls storage and retrieval of the information related to measurement data and/or statistics in the measurement data and/or statistics database.

* * * * *